United States Patent
Pedersen

[15] 3,674,280
[45] July 4, 1972

[54] SELF-CLEANING CHUCK
[72] Inventor: Harry Pedersen, Rochester, N.Y.
[73] Assignee: The Gleason Works, Rochester, N.Y.
[22] Filed: Dec. 16, 1970
[21] Appl. No.: 98,511

[52] U.S. Cl.............................................279/2, 269/48.1
[51] Int. Cl.......................................................B23b 31/40
[58] Field of Search........................279/1 R, 1 B, 1 Q, 1 W, 2; 269/48.1

[56] References Cited

UNITED STATES PATENTS

| | | | |
|---|---|---|---|
| 2,326,866 | 8/1943 | Kincaid | 279/2 |
| 3,036,838 | 5/1962 | Barber | 279/2 |
| 3,456,955 | 7/1969 | Bruinsma | 279/2 |
| 3,463,499 | 8/1969 | Mott et al. | 279/2 |
| 3,513,734 | 5/1970 | Burroughs et al. | 82/38 |

Primary Examiner—Gerald A. Dost
Attorney—Morton A. Polster

[57] ABSTRACT

A self-cleaning chuck for ring gears or like workpieces having at least one resilient annular member which expands to grip the bore of the workpiece. An annular groove is formed in the working-gripping outer circumference of the arbor, and air under pressure is delivered to the annular groove and between the arbor and the chuck body to keep the chuck free of contaminators, such as lapping compound, applied to the workpiece as it is being lapped, cut or tested. In addition, in the particular embodiment disclosed herein the arbor comprises a pair of resilient and oppositely dished annular members, and the outer circumference of the arbor member is designed to grip the workpiece generally along two lines of contact substantially coincident with the respective outermost peripheries of the external surfaces of the two dished member. A safety device for detecting workpieces having over-sized bores is included in the chuck mechanism.

15 Claims, 8 Drawing Figures

HARRY PEDERSEN
INVENTOR.

BY Morton A. Polster

HARRY PEDERSEN
INVENTOR.

BY Morton A. Polster

SELF-CLEANING CHUCK

The present invention relates to a chuck for supporting a ring gear or like part on a spindle of a gear cutting machine, gear lapping or testing machine, or the like, and more particularly it relates to an improved expansible arbor member for such chucks.

Chucks including expansible arbors, which act to grip the inner bore of a part and simultaneously draw the part rearwardly against a seat on the chuck, are well known. While the invention herein is generally applicable to any prior art chucking devices incorporating at least one resilient annular member having an outer circumferential surface adapted to expand for gripping the inner bore of a ring gear or like part, the invention will be described with particular reference to its applicability for improving prior art arbors of the type disclosed in U.S. Pat. No. 3,036,838, issued on May 29, 1962 to Harry J. Barber and assigned to the assignee herein, namely, an expansible arbor member comprising two relatively inexpensive, resilient annular members of the kind commonly known as Belleville springs. In this prior art arbor, the annular members are oppositely dished and abut at their outer peripheries and, upon axial flexure moving the central portions of the two dished members toward each other, the members expand to grip the bore of the workpiece. In order to increase the resilience of the dished members, each of them is provided with a plurality of equally spaced slots extending radially inwards from its outer periphery. In order to minimize contamination of the interior of the chuck by fluids used on the workpiece while it is being cut or lapped, the space between the two members and between their respective slots is normally filled with a resilient, compressible, rubber-like material.

Prior art expansible arbors of the type just referred above suffer from two major problems: Firstly, such prior art arbors do not satisfactorily prevent contamination of the chuck while the workpiece is being cut or lapped, and secondly, contaminating fluid (e.g., abrasive lapping compound) can work its way between the arbor and the workpiece sometimes causing damage to the bore of the workpiece on its removal from the arbor or sometimes even resulting in a loss of tolerance between the arbor and the bore of the workpiece, thereby making it difficult to remove the workpiece following de-chucking. In manually operated machinery, this chuck contamination is controlled to some extent by the operator wiping the arbor and chuck clean following each machine unloading, and the necessity for such hand wiping between machine operations has militated heretofore against the automation of lapping machinery requiring the use of such chucks.

The invention disclosed herein overcomes these prior art problems by a novel improvement in the design of such chucks and their cooperating arbor members. An annular groove is formed in the outer circumference of the arbor member and high-pressure air is fed into this groove, as well as between the arbor member and the chuck body, at least during operating periods when contaminating lapping compound is being applied to the workpiece. The pressurized air behind the arbor and that acting constantly between the bore of the workpiece and the outer circumference of the arbor, combine to keep the interior of the chuck free of the abrasive lapping compound.

In addition, the invention herein contemplates a change in the design of the outer circumference of arbors such as that disclosed in the U.S. patent to Barber referred to above. Heretofore, such arbors have been ground so that, upon flexure, the outer circumference is a flat cylindrical surface which can grip the bore of the workpiece with its full area to provide the required tight fit with the bore. However, in actual practice, the outer circumference of such prior art arbors actually often grips the bore along two lines of contact substantially coincident with the outermost periphery of the internal surfaces of the two dished Belleville spring members, permitting fluid to lodge between the bore and the arbor. According to the invention herein, the outer circumferential surface of the two dished members of the arbor are ground so that upon flexure they grip the inner bore of the workpiece generally along two lines of contacts substantially coincident with the respective outermost peripheral circumferences of the external (rather than internal) surfaces of the two dished members, thereby minimizing further the possibility of contaminating fluids working between the outer surface of the arbor and the bore of the workpiece.

A further feature of the disclosed preferred embodiment of the invention relates to the detection of oversized bores on workpieces, a condition which is inherently dangerous to both personnel and the machine due to the probability of inadequate gripping force between the part and the chuck arbor. An air pressure device is provided for generating an appropriate warning signal in the event that a workpiece with an oversized bore is loaded on the chuck.

The invention will now be described in detail with reference being made to the accompanying drawings in which.

Figure 2:
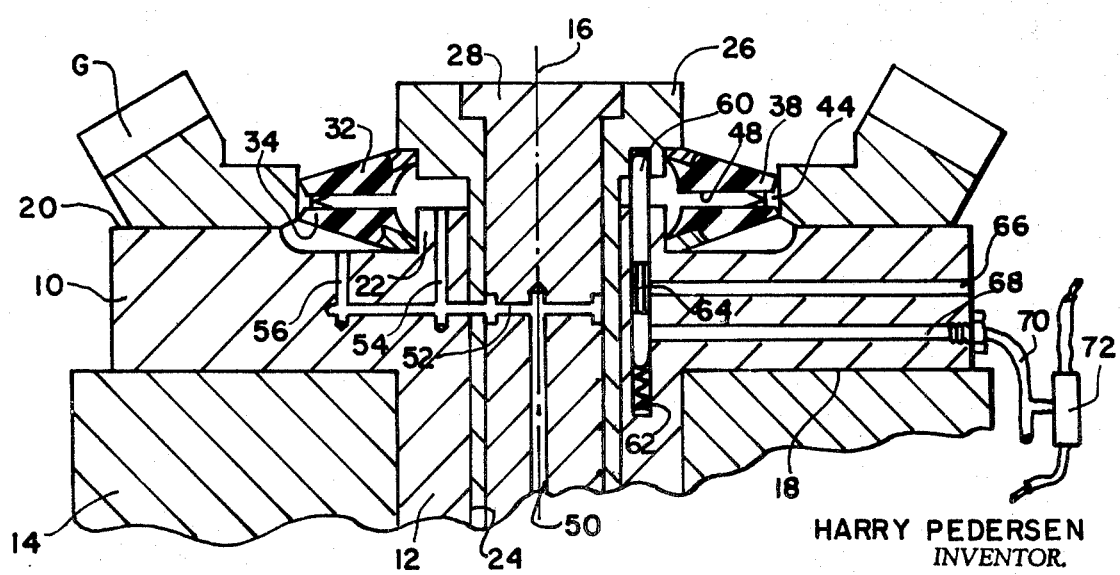
FIG. 2 is a section through the chuck and workpiece shown in FIG. 1, the section being in a plane containing their common axis of rotation.
Figure 4A:
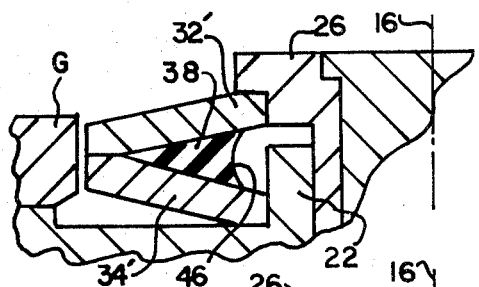
Figure 5A:
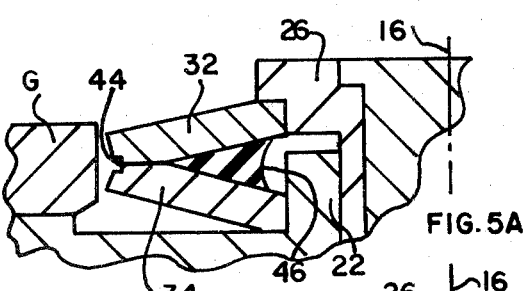
Figure 4B:
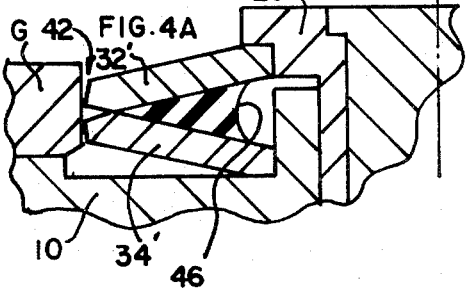
Figure 5B:
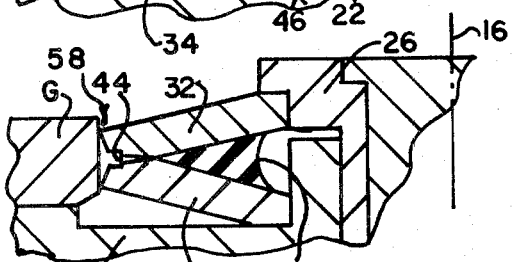

FIG. 4A and 4B illustrate a fragmentary section of a prior art arbor, taken in the same plane as that used in FIG. 2 but on a much larger scale; FIG. 4A shows the arbor in a de-chucked condition, while FIG. 4B shows the same arbor in chucked condition gripping the inner bore of a workpiece; and FIGS. 5A and 5B illustrate an arbor according to the invention herein taken in views similar to those used to illustrate the prior art device in FIGS. 4A and 4B.

Figure 1:
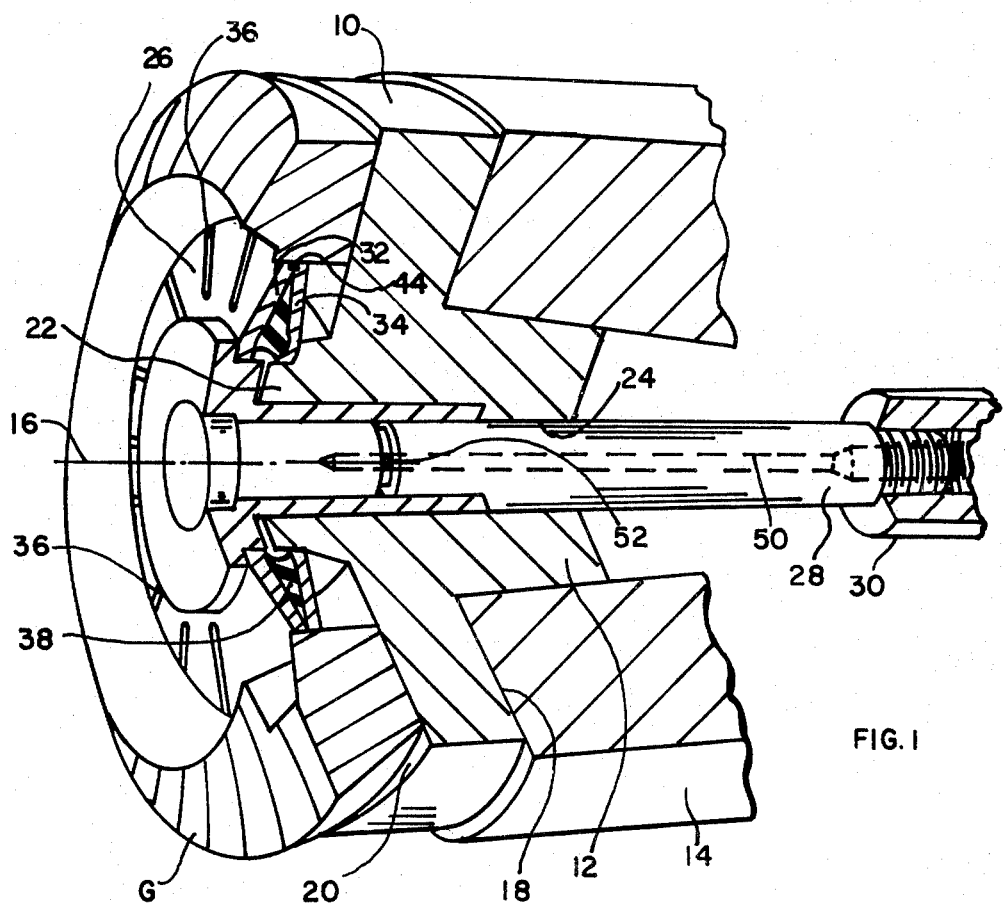
FIG. 1 is a simplified isometric and partially cross-sectioned view of a workpiece mounted on a chuck mechanism in accordance with the invention herein.

Referring first to FIGS. 1 and 2, the chuck according to the invention herein comprises a body 10 having a tapered shank 12 fitted in a tapered bore in a machine spindle 14 whose axis of rotation is designated 16. The body has a shoulder 18 for seating upon the front face of the spindle.

A front face 20 of the chuck body constitutes a seat for the rear face of a ring-shaped part, in this case bevel ring gear G. Projecting forwardly from the front of body 10 is a cylindrical hub 22 which, in the illustrated embodiment, is integral with the body. Extending through the body, including the hub, there is a cylindrical bore 24. Both this bore and the outer cylindrical surface of hub 22 are coaxial with rotation axis 16. A headed sleeve 26 has a sliding fit in bore 24 and is carried by one end of a draw bolt 28 having at its other end a screw-threaded portion for connection to a draw rod 30 for actuating the chuck.

An expansible arbor comprising a pair of resilient and oppositely dished annular members 32 and 34 is mounted so that the inner periphery of forward member 32 rides on a shoulder of headed sleeve 26, while the inner periphery of rearward member 34 rides on hub 22. These annular members are of the kind commonly called Belleville springs, and they are positioned to abut at their outer peripheries so that their respective convex surfaces form the external front and rear surfaces of the arbor. A plurality of radial slots 36 extend inwardly from the outer periphery of each dished member for the purpose of increasing their resiliency. Intermediate the internal surfaces of annular members 32 and 34 and intermediate their respective radial slots 36 is a webbing material 38 of suitably resilient and compressible rubber or plastic.

The operation of this type of chuck and arbor is well known in the art. Annular members 32 and 34 have accurately ground inner and outer circumferential surfaces, the inner circumferential surfaces being ground to accurate coaxial relation with the surface of hub 22 and headed sleeve 26, and the outer circumferential surfaces being ground so that, when the members are in their uncompressed state, a slight clearance will exist between the outer circumferential surface and the bore of the part to be chucked. After a part G is placed on the chuck, the draw rod 30 is drawn rearwardly relative to spindle 14 (to the right in FIG. 1), by a power-operated chuck actuator or other suitable means (not shown), the rod acting through draw bolt 28 and headed sleeve 26 to compress the base portions, i.e., the inner peripheries, of annular members 32 and 34 against the front face 20 of body 10. The compression of the base portions of members 32 and 34 causes their outer peripheries to expand, by toggle action, to tightly grip the bore of the part G. This same action results in the part being drawn firmly against its seat, namely, front face 20 of body 10. After the part has been tested, lapped, machined, or otherwise treated, the force applied to the draw rod is released, and the members 32, 34 spring back to their normal position, freeing the part for removal from the chuck.

Figure 3A:
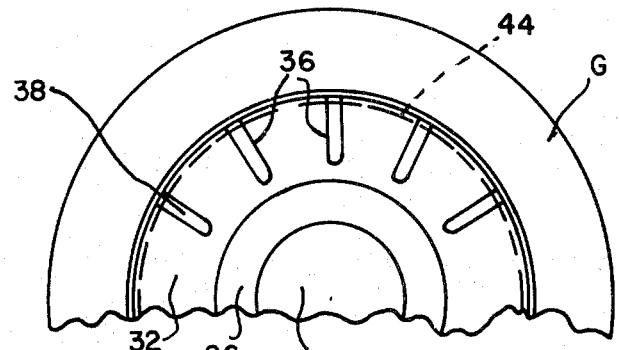
FIGS. 3A and 3B are front views, perpendicular to said axis, of the workpiece and chuck mechanism, illustrating respectively a de-chucked and chucked condition.
Figure 3B:
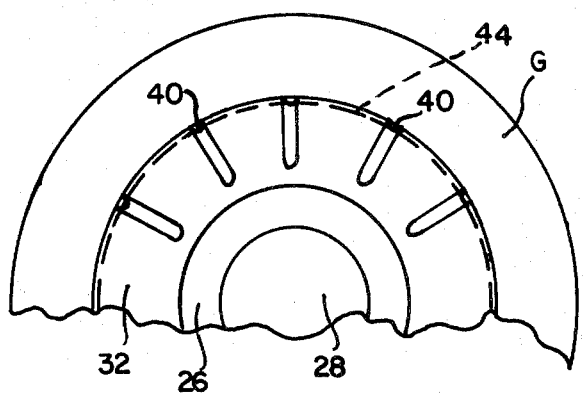

Referring now to FIG. 3A, a part G is shown mounted on the chuck with the arbor member in its "de-chucked" state. That is, annular members 32, 34 are not compressed, and it will be noted that the resilient material 38 completely fills slots 36. However, in actual practice it has been found that upon chucking, as shown in FIG. 3B, the compression of the annular members and the resulting expansion of their outer peripheries results in a deformation of webbing material 38 such that small openings 40 are formed between the open ends of slots 36 and the bore of the part G. Therefore, it can be appreciated that when the part is being worked, for instance, on a lapping machine in which lapping compound is applied to the workpiece under pressure, abrasive compound can pass through openings 40 to the interior of the chuck mechanism. Similarly, with other types of prior art arbors, any slight clearance between the arbor and workpiece when the part is being lapped can result in contamination of the chuck mechanism by the abrasive compound. The invention herein overcomes this problem, as will be explained below.

Another basic problem found in the practical operation of prior art expansible arbors of the type improved by the invention herein is illustrated by FIGS. 4A and 4B, the former showing such an arbor in its uncompressed, de-chucked condition, while FIG. 4B shows the same arbor after flexure with its outer circumferential surface gripping the bore of a part G. It has been found that the toggle action of annular members 32' and 34' of prior art arbors often causes them to contact the inner bore of the work part along two general lines of contact substantially coincident with the respective outer peripheries of their internal surfaces. When this condition exists, lapping compound enters the space (indicated by arrow 42) between the outer circumference of forward member 32' and the bore of part G. Similarly, other types of prior art chucks a spaced similar to that indicated by arrow 42 is often found between the workpiece and the outer circumference of the arbor when lapping is taking place, and if enough compound accumulates in such areas during the lapping operation, it may become extremely difficult to remove part G from the arbor due to a loss of clearance on de-chucking. Also, even though the part may be removed, the lapping compound is extremely abrasive and when part G is pulled off the arbor its bore may become scratched or damaged. Similarly, as part after part are removed under such conditions, the abrasive lapping compound causes excessive wear to occur on the finely ground outer circumference of the arbor members. Further, in the event that an operator does not wipe the arbor clean following removal of a part, the loading of the next part to be worked may be extremely difficult due to loss of clearance, or the bore of the next part may be scratched or damaged, or compound remaining on the outer circumference of the arbor may be pushed into the chuck body by this loading action.

It will be appreciated that the compound contamination referred to above in reference to FIG. 3B as well as the contamination, clearance, and damage problems just referred to in relation to FIGS. 4A and 4B, are highly undesirable. In fact, these problems are so severe with prior art chucks of the type referred to herein, that it has not been possible to consider the automatic loading and unloading of such chucks, since without an operator present, the possibilities for contamination, damage, and jammed workpieces are too great.

The invention herein overcomes these problems in two ways, namely, by providing automatic air cleaning of the chuck and arbor mechanism and by novel redesign of the outer circumferential surfaces of the arbor members.

Referring once again to FIGS. 1 and 2, and to FIGS. 5A and 5B, arbor members according to the invention herein are provided with an annular groove 44 in the outer circumferential surface formed by the abutting outer peripheral portions of the internal surfaces of members 32, 34. Similarly, an annular channel 46 may be formed in the webbing material 38 intermediate the base portions of members 32, 34, and four equally spaced passages through webbing material 38 innerconnect annular channel 46 with annular groove 44.

Air under pressure is supplied to annular channel 46 from a suitable source (not shown) through passages 50 and 52 in draw bolt 28 and passage 54 in body 10. A further passage 56 directs air under pressure to the cavity formed between the front face 20 of body 10 and the external surface of rearward annular member 36. As a result of this novel structure, it is possible to keep the outer circumferential surfaces of the arbor clean and, at the same time, prevent the contamination of the interior of the chuck. While it will be appreciated that the pressure required to provide such contamination-free operation can be determined empirically, it has been found that when operating with lapping compound being delivered to the part G at 20 psi, a counter pressure of 20 psi in the air system just described above will avoid the contamination, damage, and de-chucking problems common to the prior art as explained above.

The self-cleaning advantages of the invention are enhanced by a further feature of the novel arbor members disclosed herein. This feature can best be appreciated from FIGS. 5A and 5B which show, respectively, an arbor according to the invention herein in an uncompressed (de-chucked) condition and the same members after flexure (chucked). It can be seen that the outer circumferential surface of each annular member 32, 34 is ground to be substantially conical about their shared axis 16. It can be seen that these conical surfaces are oppositely disposed, and they are initially ground with a sufficient cone angle to assure that, upon flexure (as shown in FIG. 5B), the outer circumferential surface of the arbor will grip the bore of the part G generally along two lines of contact substantially coincident with the respective outer peripheral circumferences of the external surfaces of said annular members. It can be seen that this design presents no opening between the arbor and part G at their interface (indicated by arrow 58), thereby preventing the lapping compound from becoming wedged between the arbor and gear. This feature, along with the constant pressure of air escaping through openings 40 (FIG. 3B), results in a self-cleaning arbor which may be used with automatic loading without fear of disruption or unnecessary wear due to the problems explained above.

Referring now to another feature of the invention disclosed herein, it is well known to provide chucks with safety devices using microswitches or air pressure devices to indicate when a part has been properly seated and gripped in a chuck. Such a safety device has been incorporated in the chuck disclosed herein to facilitate automatic operation and, particularly, as a safety check since a part with an oversized bore may become extremely dangerous to the machine or personnel in the event it is not properly held by the expansible arbor of the chucking mechanism.

Referring to FIG. 2, a pin 60 is received and held in suitable bores formed in headed sleeve 26 and body 10, being maintained in the position indicated by a biasing spring 62. Pin 60 has a narrowed central portion 64 which is normally aligned with an upper air outlet 66 but not with air inlet passage 68. Air under pressure is supplied from a suitable source (not shown) through inlet 70 to passage 68 which is normally blocked by the lower portion of pin 60. In the event that a part having an oversized bore is chucked on the machine, headed sleeve 26 will be moved by draw bolt 28 farther than expected, this movement will drive pin 60 against the bias of spring 62 until its narrowed portion 64 is aligned with inlet 68, thereby providing a connection between inlet 68 and outlet 66. This results in a loss in back pressure in line 70, and this change in pressure is immediately sensed by a pressure sensitive switch 72 to provide the necessary warning of an improperly chucked part.

It should be understood that only one specific embodiment of the present invention has been described herein, and that the particular preferred form disclosed has been selected to facilitate the disclosure of the invention rather than to limit the particular form which the invention may assume. Further, it will be appreciated that various modifications, adaptations, and alterations may be applied to the specific form shown to meet various requirements of practice without any manner departing from the spirit or scope of the invention as described herein.

What is claimed is:

1. In a chuck for a ring gear or like part, said chuck including a body having a central bore and a front face with a seat for the back face of the part;
a hub portion concentric with said bore;
head means, movable by a draw bolt slidable in said bore and spaced forwardly of said hub portion; and
arbor means comprising at least one resilient annular member seated between the head means and the hub,
said resilient member having an outer circumferential surface adapted to expand for gripping the bore of said part upon axial flexure of the member effected by rearward motion of the draw rod in the body,
the improvement comprising:
an annular groove formed in the outer circumferential surface of said resilient member, and
fluid delivery means for directing air or other fluid under pressure to said annular groove at least when said member is expanded to grip said part.

2. The chuck of claim 1 wherein said fluid delivery means further comprises means for directing the fluid under pressure to a cavity formed between the front face of said body and one surface of said resilient member at least when said member is expanded to grip said part.

3. The chuck of claim 1 wherein said resilient annular member is dish-shaped and includes a plurality of radial slots extending inwardly from the outer periphery thereof and a webbing material intermediate said slots, and wherein said fluid delivery means comprises at least one passage for said fluid extending through said webbing material.

4. The chuck of claim 3 wherein said arbor means further comprises a second similar but oppositely dished resilient annular member, said pair of annular members being seated respectfully on the head means and the hub and having internal surfaces in abutment together at the respective outer peripheral portions thereof, and wherein said annular groove is formed in the outer circumferential surface formed by the abutting outer peripheral portions of said dished resilient members.

5. The chuck of claim 4 wherein the outer circumferential surface of each annular member is substantially conical about the axis of said central bore so that upon axial flexure said members grip the bore of said part generally along two lines of contact substantially coincident with the respective outer peripheral circumferences of the external surfaces of said members.

6. The chuck of claim 1 wherein said fluid delivery means further comprises passages through said draw bolt and hub portion for delivering said fluid to said annular groove.

7. The chuck of claim 1 further comprising safety-check means responsive to the relative movement between the draw bolt and body for indicating when said movement exceeds a predetermined distance.

8. The chuck of claim 7 wherein said safety-check means includes a passage, an element positionable into and out of blocking relationship to said passage in response to the movement of the head means relative to said body, and means for sensing the blocking or unblocking of said passage.

9. The chuck of claim 8 wherein said safety-check means also includes means for directing fluid under pressure into said passage and said sensing means is sensitive to changes in the pressure of the fluid in the passage.

10. The chuck of claim 4 wherein said webbing comprises a resilient, compressible material which fills the spaces between the internal surfaces of said dished members and between their respective slots except for an annular base channel between the inner peripheries of said members, and said fluid delivery means includes at least one passage for said fluid extending through said resilient material to said annular groove.

11. The chuck of claim 1 wherein a space is formed between the hub portion and said resilient member when said resilient member is flexed to grip said workpiece, and said fluid delivery means also includes at least one passage for said fluid extending through said hub portion to said space between the resilient member and the hub.

12. In an expansible arbor device for a chuck for a ring gear or like part, said device having a resilient annular member with an outer circumferential surface adapted to expand for gripping the bore of said part upon actuation of said chuck, the improvement comprising: an annular groove formed in said outer circumferential surface and at least one passageway suitable for delivering fluid under pressure through said annular member to said annular groove.

13. An expansible arbor device according to claim 12 wherein said resilient annular member is dish-shaped and includes a plurality of radial slots extending inwardly from the outer periphery thereof and a webbing material intermediate said slots, and wherein said fluid delivery means comprises at least one passage for said fluid extending through said webbing material.

14. An expansible arbor device according to claim 13 wherein said device further comprises a second similar but oppositely dished resilient annular member, said pair of annular members having internal surfaces in abutment together at the respective outer peripheral portions thereof, and wherein said annular groove is formed in the outer circumferential surface formed by the abutting outer peripheral portions of said dished resilient members.

15. An expansible arbor device according to claim 14 wherein said webbing comprises a resilient, compressible material which fills the spaces between the internal surfaces of said dished members and between their respective slots except for an annular base channel between the inner peripheries of said members, and said fluid delivery means includes at least one passage for said fluid extending through said resilient material to said annular groove.

* * * * *